Feb. 20, 1945. T. H. QUINN 2,369,915

LIQUID FILTER

Filed March 3, 1943

Inventor:
Thos. H. Quinn
By
Attorney

Patented Feb. 20, 1945

2,369,915

UNITED STATES PATENT OFFICE 2,369,915

LIQUID FILTER

Thomas H. Quinn, Chicago, Ill.

Application March 3, 1943, Serial No. 477,831

2 Claims. (Cl. 210—135)

This invention relates to liquid filtering devices which can be used in connection with any liquid feeding systems so as to purify and decontaminate the said liquid of such impurities and foreign matter which are physically admixed therewith.

One object of my invention is to provide a filtering means which is provided with staggered baffle plate means adapted to receive a quantity of closely packed comminuted material to provide filtering action.

Another object of my invention is to provide a filtering device of the aforementioned character which has filtering container means removable therefrom, in order to facilitate the replenishment or exchange of the comminuted material which had become contaminated with impurities after a predetermined time of its function as a filter.

Another object of my invention is to provide a filtering device of the aforementioned character which is practical in construction, efficient in its use and operation, readily installed and removed from installation, and of such simple construction that it will lend itself readily to economical quantity production.

Other objects, features and advantages resident in my invention will become apparent from an examination of the accompanying drawing and the ensuing description, in which like symbols will designate like parts, and in which.

Figure 1:
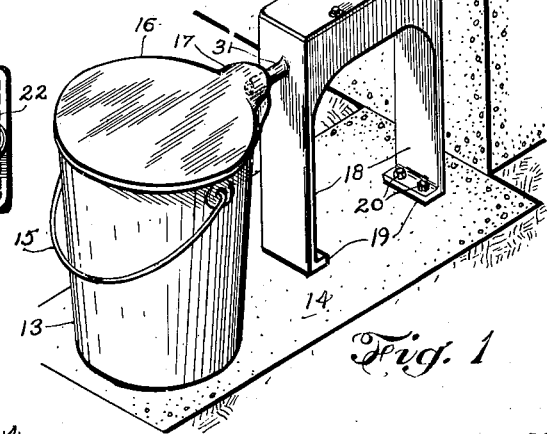
Fig. 1 represents an isometric view partly broken showing the application of my filtering unit to a rain water draining system.

Referring to the various views in Figure 1, 8 generally, designates a building structure partly broken in order to facilitate depicting the essential structure of my invention. The gutter 9 is mounted on the eaves, and it is in turn connected to the drain pipe 10, which by virtue of the adapter fitting 11 is secured to the inlet 22 of my invention.

My invention is, generally, designated 12 and has an outlet 31 which is adapted to enter a pouring spout or orifice 17 of a pail or receptacle 13, having a handle 15 suitable for carrying the same, it having also a protecting cover 16 in order to shield the opening of the said receptacle 13 from receiving the rain water directly, the rain water being fed thereinto, primarily, after it has run down the drain pipe 10, filtered through my device, generally, designated 12, into the receptacle 13 so that filtered rain water may be thus kept clear of the rain drops which would tend to contaminate the filtered water strained through my device.

My device rests on the ground surface 14, its legs 18 having feet portions 19, secured by virtue of bolts 20 or similar fastenings.

Figure 2:
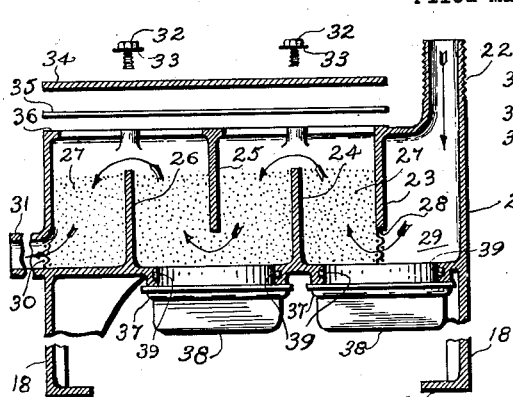
Fig. 2 is a longitudinal cross-sectional view of my device showing its construction in detail.
Figure 3:
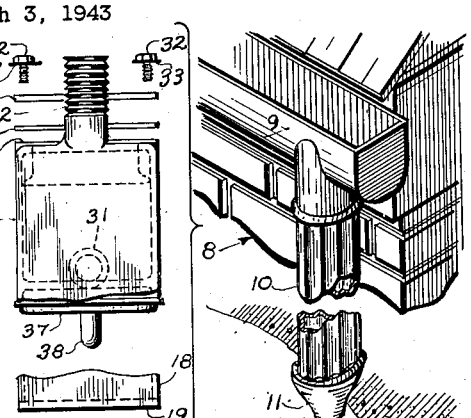
Fig. 3 is an end view of Figure 2.
Figure 4:
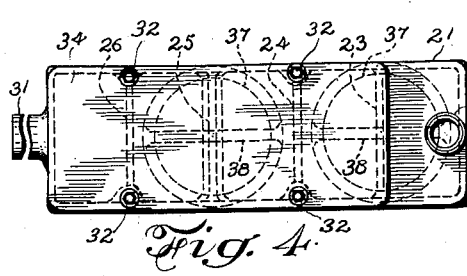
Fig. 4 is a top elevational view of Figure 2.

In Figures 2, 3 and 4, I show one form of my invention which is comprised of the body 21 having a threaded inlet portion 22 adapted to be secured to a drain-pipe 10 by virtue of the adapter fitting 11. The body may be made of cast metal or any other suitable material and is provided with a number of alternately positioned baffle plates designated 23, 24, 25 and 26.

The receiving well 29 for the rain water or liquid is interconnected through the screened opening 28 with the partitioned chamber containing the comminuted material 27 which may be sand or any other suitable filtering material which is packed down tightly, however not so as to fill the partitioned compartment, thus allowing the water to circulate and filter through the comminuted material, the path taken by the liquid indicated by the arrows shown in Figure 2, the outlet 31 permitting the filtered water to be accumulated or received in receptacle 13 or any other suitable receptacle.

The outlet is also provided with suitable strainer means 30 in order to prevent the comminuted material from being drained off with the water or washed away therewith.

The body is provided with an opening at the top near the surface 36 upon which is mounted the gasket 35 and the cover plate 34 held securely in place by virtue of screws 32 and lock washers 33. The lower portion or the bottom is provided with two openings having a bayonet lock joint 39 adapted to receive the caps 37 provided with the convenient hand grips 38 to permit removal thereof which it is desired to remove the "fouled" sand, preparatory to filling with fresh filtering material.

Figure 6:
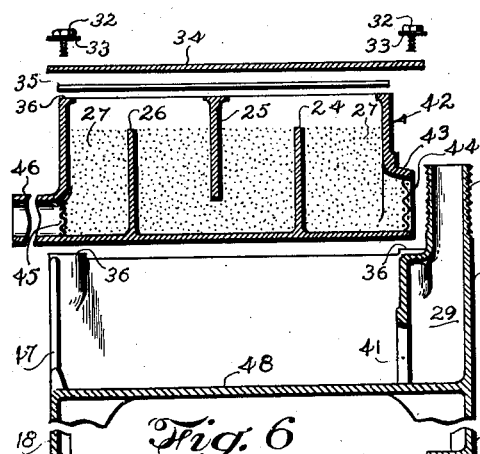
Fig. 6 is a longitudinal cross-sectional view showing the device illustrated in Figure 5 dismantled for re-assembly.
Figure 5:
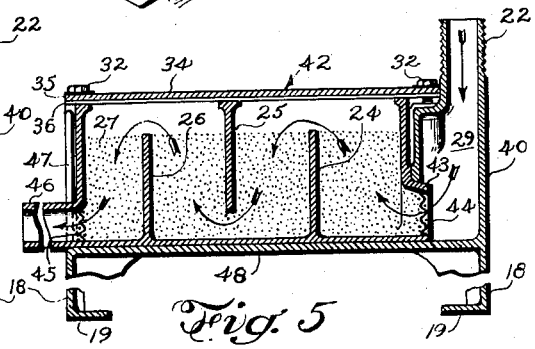
Fig. 5 is a longitudinal cross-sectional view of a slightly modified form of my invention.
Figure 7:
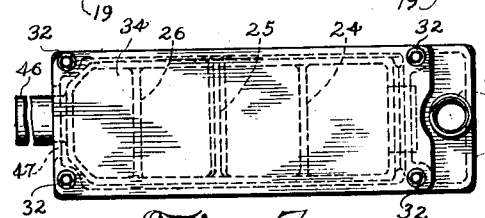
Fig. 7 is a top elevational view of Figure 6.

The form shown in Figures 5, 6 and 7 is similar to the form shown in Figures 2, 3 and 4 with the exception that the body, generally, designated 40 has a web portion with an opening 41 in order to receive an inner member, generally, designated 42, the hub 43 thereof fitting into the said recess 41, while one end of the said body 40 is slotted at 47 in order to permit the outlet 46 to be slid down therein and thus permit the bearing portion 43 to fit within the recess 41 to make a water-tight connection as shown in Figure 5. The member 42 is similar in construction internally as body 21, that is, in having alternate web portions 24, 25 and 26 and a quantity of comminuted material as well as the strainer or wire mesh elements 44 and 45, similar to elements 28 and 30 in the form shown in Figure 2. It is likewise provided with a top plate 34, a gasket 35, and screws 32 and lock washers 33.

The body or the outer container 40 has a solid bed portion 48, because in this particular instance, when it is desired to change the comminuted filtering material which has become contaminated with foreign matter and impurities, the inner body 42 is removed from the outer casing 40 permitting body 42 to be upset or overturned discharging the "fouled" comminuted material 27. New comminuted material is then placed therein and the device is then ready for continued filtering action.

Although I have indicated an application of my particular invention in connection with filtering rain water, it is to be understood, that my invention can be used in any liquid feeding system, which may require filtration action. It also may be used in connection with sewage systems, or any other systems, wherein my invention would specifically apply and operate efficiently, moreover, it may be used in chemical laboratories, as well as many other similar uses and applications to which my invention may be adapted.

Even though I have described and revealed rather succinctly my invention, I recognize that it is susceptible of modification, alteration, and improvement, hence, I reserve the right to all modifications, alterations, and improvements which come within the scope and spirit of the accompanying drawing, and as well those which come within the purview of the subject matter expounded in the foregoing description; my invention to be limited to the following claims.

Having thus described and revealed my invention, what I claim as novel and desire to secure by Letters Patent is:

1. In a liquid filtering device of the character described, body means consisting of a bottom, two side walls and two end walls being open at the top and provided with inlet means adjacent one end wall and terminating in an enlarged opening, and also provided with a slotted portion open at the top and located on the end wall of said body means opposite the said enlarged opening, and filtering body means removably secured to the said body means, the said filtering body means provided with inlet means adapted to locate within the said enlarged opening, and further provided with outlet means adapted to locate within the said slotted portion, the said filtering body means being of a configuration adapted to nest within the said body means, the compartment of the said filtering body means being provided with alternately disposed baffle plates adapted to cause a liquid to be circulated therethrough in a sinuous path.

2. A liquid filtering device of the character described, comprising an outer body element consisting of a bottom, two end walls and two side walls being open at the top and provided with inlet means adjacent one end wall and terminating in an enlarged opening, and further provide with a slotted portion open at the top and located on the end wall of said outer body element opposite the said enlarged opening, an inner filtering body element provided with inlet means adapted to locate within the said enlarged opening, and further provided with outlet means adapted to locate within the said slotted portion, a compartment in said inner filtering body element provided with alternately disposed baffle plate means and being partly filled with comminuted material adapted to cause a liquid to flow therethrough in a sinuous path, strainer means secured within the compartment of the said inner filtering body element at the said inlet and outlet means, a cover element adapted to seal the said compartment and retain the assemblage of the said outer body element and the said inner filtering body element, the said inner filtering body element being of a configuration adapted to nest within the said outer body element, and fastening means adapted to secure the said cover element and the said inner filtering body element within the said outer body element.

THOMAS H. QUINN.